(12) United States Patent
Bates

(10) Patent No.: US 12,007,402 B2
(45) Date of Patent: Jun. 11, 2024

(54) LABORATORY SAMPLE CONTAINER CARRIER CLEANING APPARATUS AND LABORATORY SAMPLE DISTRIBUTION SYSTEM

(71) Applicant: Roche Diagnostics Operations, Inc., Indianapolis, IN (US)

(72) Inventor: Christopher William Bates, Tamm (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 377 days.

(21) Appl. No.: 17/317,181

(22) Filed: May 11, 2021

(65) Prior Publication Data

US 2021/0364540 A1    Nov. 25, 2021

(30) Foreign Application Priority Data

May 20, 2020   (EP) ..................................... 20175845

(51) Int. Cl.
*G01N 35/04*      (2006.01)
(52) U.S. Cl.
CPC ..... *G01N 35/04* (2013.01); *G01N 2035/0477* (2013.01); *G01N 2035/0491* (2013.01)
(58) Field of Classification Search
CPC .......... G01N 35/04; G01N 2035/0477; G01N 2035/0491; G01N 2035/0441; G01N 2035/0437; B01L 9/52; B01L 2300/0609; B01L 2300/0663; B01L 13/02; B01L 2200/023; B01L 2300/0803; B01L 9/00; B65G 45/22; B65G 29/00; B65G 45/10; B65G 47/82; B65G 47/90; B65G 2201/0235

See application file for complete search history.

(56) References Cited

U.S. PATENT DOCUMENTS

| 3,082,778 A | 3/1963 | Cole |
| 3,194,400 A * | 7/1965 | Herndon .................... B04B 5/04 |
| | | 210/324 |
| 4,073,376 A * | 2/1978 | Krooss .................... B65G 45/22 |
| | | 15/97.1 |
| 4,391,372 A * | 7/1983 | Calhoun ................ B65G 47/71 |
| | | 209/523 |

(Continued)

FOREIGN PATENT DOCUMENTS

| EP | 2908139 A2 | 8/2015 |
| EP | 3456415 A1 | 3/2019 |

(Continued)

OTHER PUBLICATIONS

European Search Report issued Jun. 18, 2020, in Application No. 20175845.5, 2 pp.

*Primary Examiner* — P. Kathryn Wright
*Assistant Examiner* — Curtis A Thompson
(74) *Attorney, Agent, or Firm* — Woodard, Emhardt, Henry, Reeves & Wagner, LLP

(57) ABSTRACT

A laboratory sample container carrier cleaning apparatus is provided comprising a revolving device, being adapted to move a sample container carrier supplied to the revolving device along a circular path, and a cleaning device, being adapted to clean the sample container carrier being moved along the circular path.

10 Claims, 3 Drawing Sheets

(56) References Cited

U.S. PATENT DOCUMENTS

| | | | |
|---|---|---|---|
| 4,708,153 A | 11/1987 | Hambleton et al. | |
| 4,820,351 A | 4/1989 | Hambleton et al. | |
| 5,173,741 A | 12/1992 | Wakatake | |
| 6,197,255 B1 | 3/2001 | Miyake et al. | |
| 6,364,959 B1 * | 4/2002 | Straub | B65G 45/22 |
| | | | 162/278 |
| 2004/0124109 A1 * | 7/2004 | Hassinen | G01N 35/04 |
| | | | 206/443 |
| 2010/0319148 A1 * | 12/2010 | Yu | A47L 13/255 |
| | | | 15/97.1 |
| 2014/0231217 A1 * | 8/2014 | Denninger | G01N 35/00584 |
| | | | 198/619 |
| 2014/0294699 A1 * | 10/2014 | Akutsu | G01N 35/04 |
| | | | 422/551 |
| 2017/0212141 A1 | 7/2017 | Schacher et al. | |
| 2018/0017590 A1 | 1/2018 | Diamond et al. | |
| 2018/0321268 A1 * | 11/2018 | Schacher | B65G 37/005 |
| 2019/0076846 A1 | 3/2019 | Durco et al. | |

FOREIGN PATENT DOCUMENTS

| | | |
|---|---|---|
| EP | 2773968 B1 | 3/2020 |
| JP | 2011-220887 A | 11/2011 |
| WO | 2017/125355 A1 | 7/2017 |

* cited by examiner

LABORATORY SAMPLE CONTAINER CARRIER CLEANING APPARATUS AND LABORATORY SAMPLE DISTRIBUTION SYSTEM

CROSS-REFERENCE TO RELATED APPLICATIONS

This application claims priority to European Patent Application No. 20175845.5, filed 20 May 2020, the disclosure of which is hereby incorporated by reference in its entirety.

TECHNICAL FIELD

The disclosure relates to a laboratory sample container carrier cleaning apparatus and to a laboratory sample distribution system.

SUMMARY

Although the embodiments of the present disclosure are not limited to specific advantages or functionality, it is noted that in accordance with the present disclosure the laboratory sample container carrier cleaning apparatus and the laboratory sample distribution system efficiently clean laboratory sample container carriers.

In accordance with one embodiment of the present disclosure, a laboratory sample container carrier cleaning apparatus is provided comprising a revolving device, being adapted to move a sample container carrier supplied to the revolving device along a circular path, and a cleaning device, being adapted to clean the sample container carrier being moved along the circular path.

In accordance with another embodiment of the present disclosure, a laboratory sample distribution system is provided, wherein the laboratory sample distribution system comprises a number of sample container carriers, wherein the sample container carriers are adapted to carry one or more sample containers, wherein the sample containers comprise samples to be analyzed; a transport plane, wherein the transport plane is adapted to support the sample container carriers; drive means, wherein the drive means are adapted to move the sample container carriers on top of the transport plane; and a laboratory sample container carrier cleaning apparatus according to an embodiment of the present disclosure.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
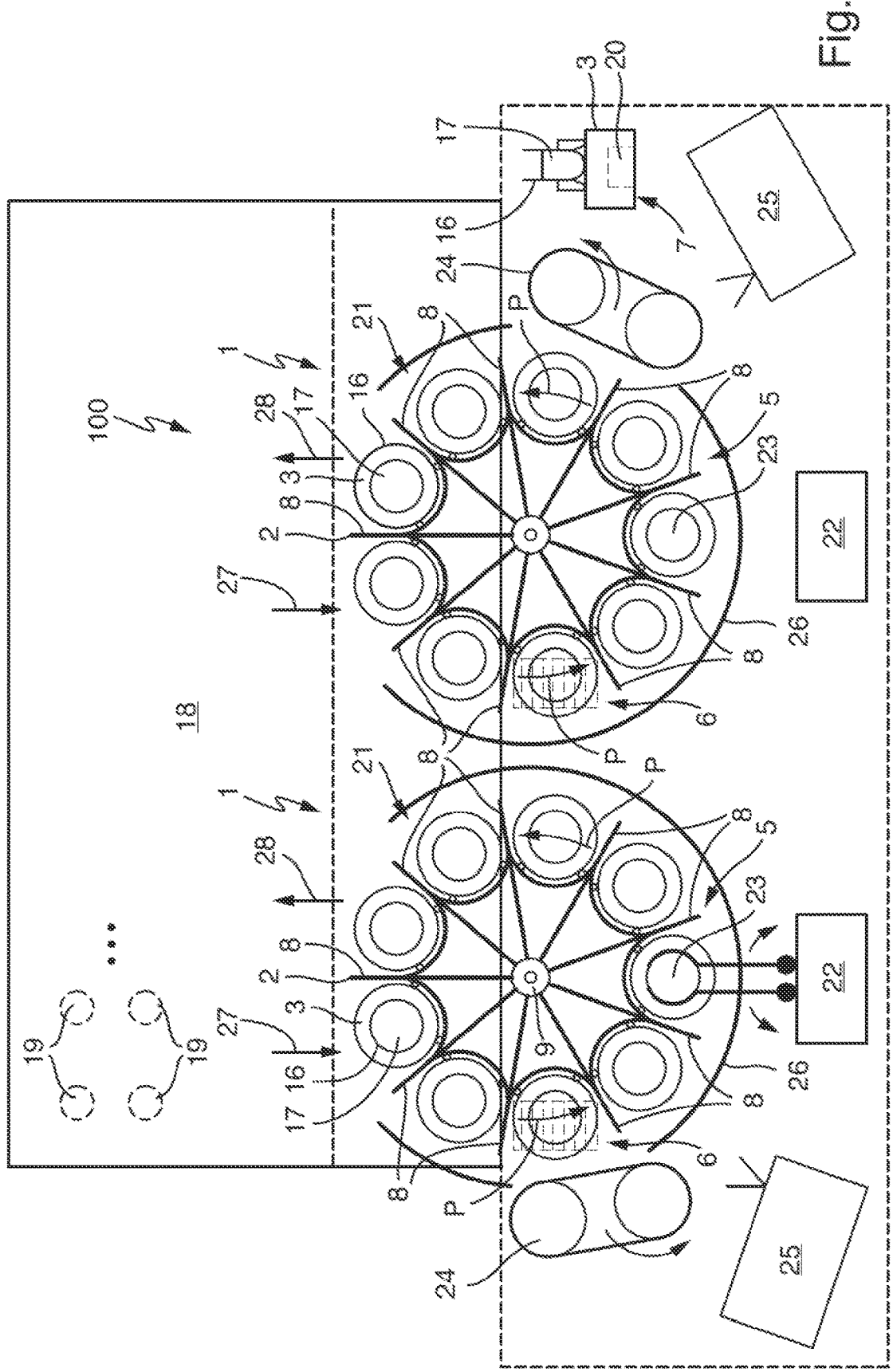
FIG. 1 schematically depicts a top view of a laboratory sample distribution system comprising a laboratory sample container carrier cleaning apparatus.

Skilled artisans appreciate that elements in the figures are illustrated for simplicity and clarity and have not necessarily been drawn to scale. For example, dimensions of some of the elements in the figures may be exaggerated relative to other elements to help improve understanding of the embodiment(s) of the present disclosure.

DETAILED DESCRIPTION

The laboratory sample container carrier cleaning apparatus comprises a revolving device being adapted to move a sample container carrier supplied to the revolving device along a circular path.

The laboratory sample container carrier cleaning apparatus further comprises a cleaning device, being adapted to clean at least a part of the sample container carrier being moved along the circular path.

According to an embodiment, the laboratory sample container carrier cleaning apparatus comprises a flat driving surface, wherein the revolving device is adapted to push the sample container carrier supplied to the revolving device on top of the flat driving surface along the circular path. The driving surface comprises at least one opening, e.g., in form of a lattice. The cleaning device is adapted to clean a bottom surface of a sample container carrier being placed above the opening. The opening is typically smaller than a footprint of the sample container carrier.

According to an embodiment, the revolving device further comprises a number of pushing cavities or recesses being adapted to receive a sample container carrier to be rotated and being adapted to push a sample container carrier being received along the circular path.

According to an embodiment, a respective pushing cavity comprises or is formed by two, e.g., blade shaped, side walls, wherein the side walls rotate around an axis of rotation of the revolving device, wherein a side wall pushes a sample container carrier being in contact with the side wall along the circular path.

According to an embodiment, the side walls contact each other along the axis of rotation of the revolving device.

The revolving device may comprise a cylindrical outer wall, wherein the side wall or pushing cavities rotate inside the outer wall.

According to an embodiment, a brush is arranged at an edge of a respective side wall facing towards the driving surface. If dirt is located on the driving surface, a respective brush guides the dirt to the opening in the driving surface, such that the dirt can be efficiently removed from the driving surface.

According to an embodiment, the cleaning device comprises a vacuum pump being adapted to provide a negative pressure in a volume below the opening, such that dirt can be sucked from the sample container carrier and/or the driving surface towards the volume.

According to an embodiment, the cleaning device comprises a movable cleaning belt, wherein the cleaning belt partially extends parallel to the driving surface inside the opening, in particular at the same vertical level as the driving surface. The cleaning belt is adapted to clean the bottom surface of a sample container carrier being placed above the opening.

According to an embodiment, the cleaning device comprises a cleaning fluid dispenser being adapted to dispense cleaning fluid to the cleaning belt.

The laboratory sample distribution system comprises a number of sample container carriers, wherein the sample container carriers are adapted to carry one or more sample containers, wherein the sample containers comprise samples to be analyzed, e.g., samples of body fluids, in particular blood samples. The sample container carriers may, e.g., be embodied as disclosed in EP 2 908 139 A2 or EP 3 456 415 A1 or similar to those sample containers carriers. The sample containers are typically embodied as conventional laboratory sample tubes. Reference insofar is made to the relevant technical literature.

The laboratory sample distribution system further comprises a flat transport plane or transport surface, wherein the transport plane is adapted to support the sample container carriers. The transport plane and the drive means may, e.g., be embodied as disclosed in EP 2 773 968 B1.

The laboratory sample distribution system further comprises drive means, wherein the drive means are adapted to move the sample container carriers on top of the transport plane along corresponding transport paths independently from one another.

The laboratory sample distribution system further comprises a laboratory sample container carrier cleaning apparatus as described above.

According to an embodiment, the transport plane is arranged adjacent to and at the same vertical level as the driving surface, wherein the drive means are adapted to supply sample container carriers to the revolving device and remove sample container carriers from the revolving device.

According to an embodiment, the sample container carriers comprise at least one magnetically active device, typically at least one permanent magnet, wherein the drive means comprise a number (e.g., 2 to 1000) of electro-magnetic actuators being stationary arranged in rows and columns below the transport plane. The electro-magnetic actuators are adapted to apply a magnetic driving force to the container carriers According to an embodiment, the laboratory sample distribution system further comprises a gripping or pick-and-place device being adapted to insert a sample container into a sample container carrier being positioned at a hand-over position and/or remove a sample container from a sample container carrier being positioned at the hand-over position, wherein the hand-over position is located on the circular path.

FIG. 1 schematically depicts a top view of a laboratory sample distribution system 100. The laboratory sample distribution system 100 comprises a plurality of sample container carriers 3, wherein the sample container carriers 3 are adapted to carry one sample container 16, wherein the sample containers 16 comprise samples 17 to be analyzed.

The laboratory sample distribution system 100 further comprises a flat transport plane 18, wherein the transport plane 18 is adapted to support the sample container carriers 3. In other words, the sample container carriers 3 are placed on top of the transport plane 18.

The laboratory sample distribution system 100 further comprises drive means 19 in form of electro-magnetic actuators arranged in rows and columns below the transport plane 18, wherein the electro-magnetic actuators 19 are adapted to move the sample container carriers 3 on top of the transport plane 18 by applying a magnetic force to a magnetically active device 20 in form of a permanent magnet arranged in a bottom portion of the sample container carriers 3.

The laboratory sample distribution system 100 further comprises two laboratory sample container carrier cleaning apparatuses 1 being adapted to clean a bottom surface 7 of the sample container carriers 3. The two laboratory sample container carrier cleaning apparatuses 1 are embodied equally. In the following, the configuration of one of the laboratory sample container carrier cleaning apparatuses 1 is described, wherein this description applies for both laboratory sample container carrier cleaning apparatuses 1.

The laboratory sample container carrier cleaning apparatus 1 comprises a revolving device 2 being adapted to move sample container carriers 3 supplied to the revolving device 2 from the transport plane 18 along a circular path P.

Figure 2:
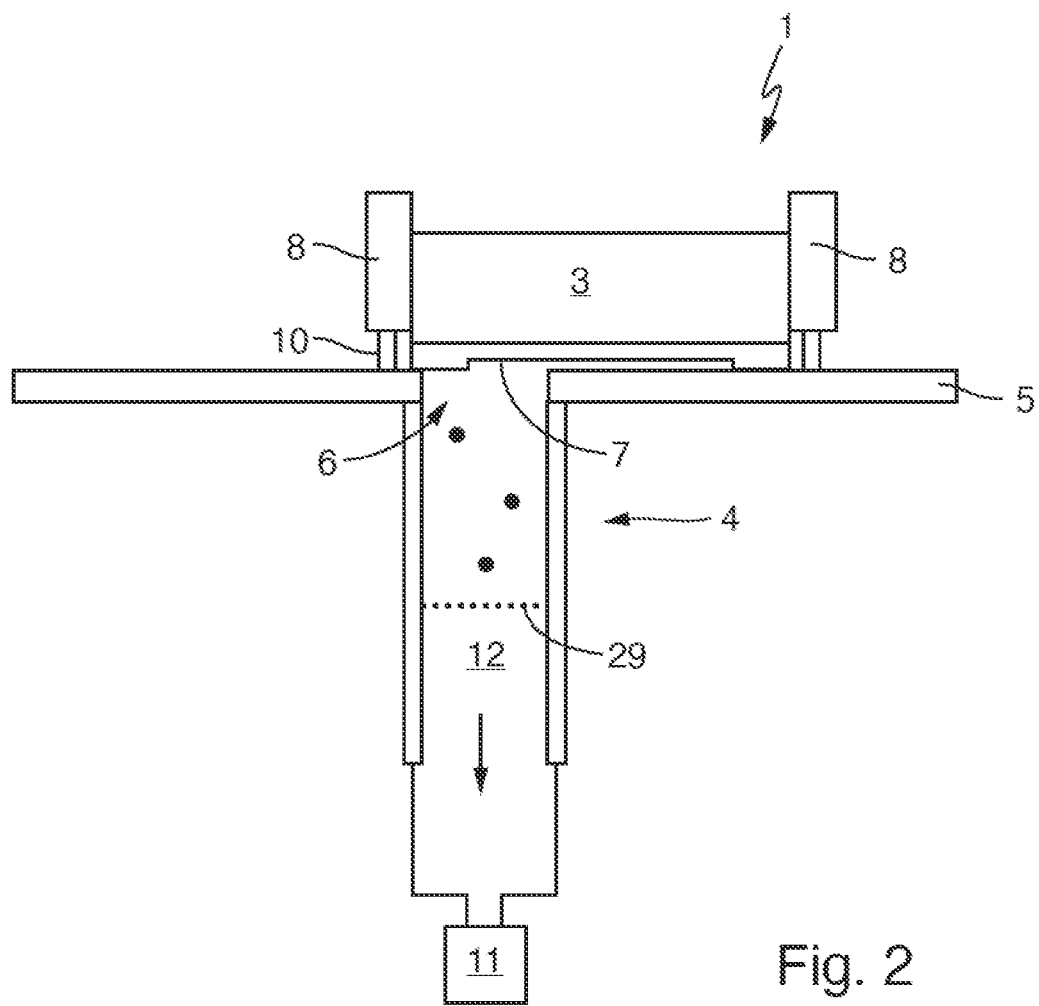
FIG. 2 schematically depicts a cross-sectional side-view of the sample container carrier cleaning apparatus according to a first embodiment.
Figure 3:
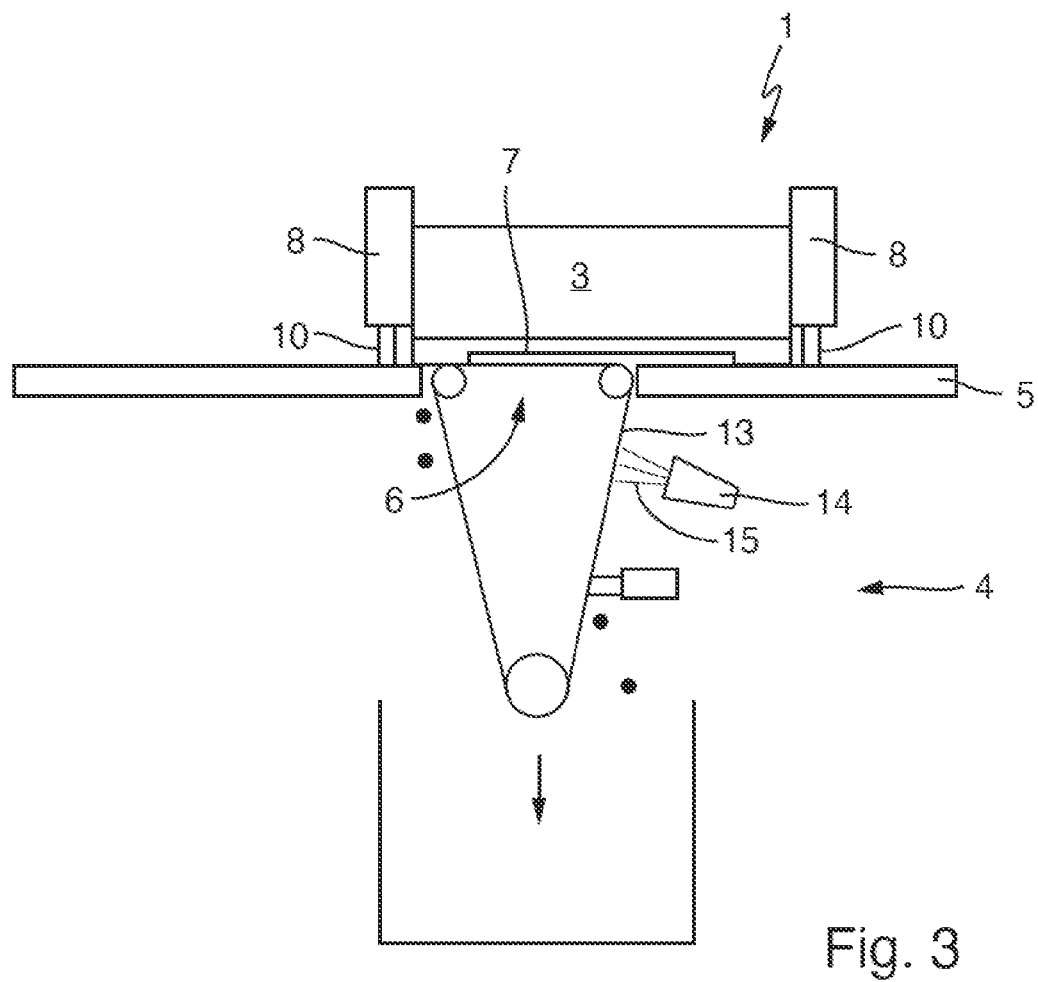
FIG. 3 schematically depicts a cross-sectional side-view of the sample container carrier cleaning apparatus according to a further embodiment.

The laboratory sample container carrier cleaning apparatus 1 further comprises a cleaning device 4, see FIGS. 2 and 3.

The laboratory sample container carrier cleaning apparatus 1 further comprises a driving surface 5, wherein the revolving device 2 is adapted to push the sample container carriers 3 supplied to the revolving device 2 on top of the driving surface 5 along the circular path P.

The driving surface 5 comprises an opening 6 in form of a grating or grid, wherein the cleaning device 4 is adapted to clean the bottom surface 7 of the sample container carriers 3 being placed above the opening 6.

The transport plane 18 is arranged gapless adjacent and at the same vertical level to the driving surface 5, wherein the drive means 19 are adapted to supply/remove the sample container carriers 3 to/from the revolving device 2 as necessary. The sample container carriers 3 are supplied to the revolving device 2 in a direction 27 and are removed from the revolving device 2 in a direction 28.

The revolving device 2 comprises a number of pushing cavities 21 being adapted to receive the sample container carriers 3 to be rotated. A respective pushing cavity 21 comprises two radially extending side walls 8, wherein the side walls 8 rotate around an axis 9 of rotation of the revolving device 2. A side wall 8 pushes a sample container carrier 3 being in contact with the side wall 8 along the circular path P. The side walls 8 are arranged in form of a star and contact each other along the axis 9 of rotation. In total, the revolving device 2 comprises nine side walls 8 forming nine pushing cavities 21.

The revolving device 2 comprises a fixed cylindrical outer wall 26, wherein the side walls 8 rotate inside the outer wall 26. The cylindrical outer wall 26 radially guides the rotating sample container carriers 3 along the circular path P.

An optional brush 10, see FIG. 2, is arranged at an edge of a respective side wall 8 facing towards the driving surface 5.

The laboratory sample distribution system 100 further comprises two gripping devices 22, one assigned to the left revolving device 2 and one assigned to the right revolving device 2.

The left gripping device 22 is adapted to remove a sample container 16 from a sample container carrier 3 being positioned at a hand-over position 23 located on the circular path P. The removed sample container 16 may, e.g., be transported to any kind of further processing.

The right gripping device 22 is adapted to insert a sample container 16 into an empty sample container carrier 3 being positioned at the hand-over position 23.

The laboratory sample distribution system 100 further comprises two image processing devices 25, e.g., being adapted to take images of the sample containers 16 and process these images, e.g., to determine the presence of a cap on the sample containers 16, to read a barcode, etc. In order to rotate the sample containers 16 to establish a desired field of view on the sample container 16, the laboratory sample distribution system 100 further comprises two rotating manipulators 24.

FIG. 2 schematically depicts a cross-sectional side-view of the sample container carrier cleaning apparatus 1 according to a first embodiment. The cleaning device 4 of the sample container carrier cleaning apparatus 1 comprises a vacuum pump 11 being adapted to provide a negative pressure in a volume 12 below the opening 6 acting as a sort of vacuum cleaner. In other words, dirt located above the opening 6 is sucked into the volume 12 and is disposed in a filter 29 being placed in an air flow path of the volume 12.

FIG. 3 schematically depicts a cross-sectional side-view of the sample container carrier cleaning apparatus 1 according to a second embodiment. The cleaning device 4 of the sample container carrier cleaning apparatus 1 according to this embodiment comprises a rotating cleaning belt 13, wherein the cleaning belt 13 partially extends parallel to the driving surface 5 inside the opening 6. The cleaning belt 13 contacts and cleans the bottom surface 7 of sample container carriers 3 being placed above the opening 6.

The cleaning device 4 further comprises a cleaning fluid dispenser 14 being adapted to dispense cleaning fluid 15 to the cleaning belt 13.

What is claimed is:

1. A laboratory sample container carrier cleaning apparatus, comprising:
    a revolving device configured to move a sample container carrier supplied to the revolving device along a circular path;
    a cleaning device, configured to clean the sample container carrier being moved along the circular path; and
    a driving surface, wherein the revolving device is configured to push the sample container carrier supplied to the revolving device on top of the driving surface along the circular path,
        wherein the driving surface comprises at least one opening, and
        wherein the cleaning device is adapted to clean a bottom surface of the sample container carrier being placed above the at least one opening, the cleaning device comprising a vacuum pump configured to provide a negative pressure in a volume below the at least one opening.

2. The laboratory sample container carrier cleaning apparatus according to claim 1, wherein the revolving device comprises a number of pushing cavities configured to receive the sample container carrier to be rotated and configured to push the sample container carrier received along the circular path.

3. The laboratory sample container carrier cleaning apparatus according to claim 2, wherein each of the number of pushing cavities comprises two side walls, wherein the side walls rotate around an axis of rotation of the revolving device, and
    wherein for each of the number of pushing cavities one of the two side walls pushes the sample container carrier in contact with the one side wall along the circular path.

4. The laboratory sample container carrier cleaning apparatus according to claim 3, wherein the side walls contact each other along the axis of rotation of the revolving device.

5. The laboratory sample container carrier cleaning apparatus according to claim 1, wherein a brush is arranged at an edge of a respective side wall facing towards the driving surface.

6. A laboratory sample distribution system, wherein the laboratory sample distribution system comprises:
    a number of sample container carriers, wherein the sample container carriers are adapted to carry one or more sample containers, wherein the sample containers comprise samples to be analyzed,
    a transport plane, wherein the transport plane is configured to support the sample container carriers,
    drive means, wherein the drive means are configured to move the sample container carriers on top of the transport plane, and
    the laboratory sample container carrier cleaning apparatus according to claim 1.

7. The laboratory sample distribution system according to claim 6, wherein the transport plane is arranged adjacent to the driving surface, and wherein the drive means are adapted to supply the sample container carriers to the revolving device.

8. The laboratory sample distribution system according to claim 6, wherein each of the sample container carriers comprises at least one magnetically active device, and wherein the drive means comprise a number of electro-magnetic actuators being stationary arranged in rows and columns below the transport plane, the electro-magnetic actuators being adapted to apply a magnetic force to the sample container carriers.

9. The laboratory sample distribution system according to claim 8, wherein the at least one magnetically active device comprises at least one permanent magnet.

10. The laboratory sample distribution system according to claim 6, wherein the laboratory sample distribution system further comprises:
    a gripping device configured to insert sample containers into the sample container carriers positioned at a hand-over position and/or remove the sample containers from the sample container carriers positioned at the hand-over position, wherein the hand-over position is located on the circular path.

* * * * *